(12) United States Patent
Armanini, Jr. et al.

(10) Patent No.: US 8,837,462 B2
(45) Date of Patent: Sep. 16, 2014

(54) SWITCH USAGE FOR ROUTING ETHERNET-BASED AIRCRAFT DATA BUSES IN AVIONICS SYSTEMS

(75) Inventors: Paulo Roberto Armanini, Jr., Sao Jose dos Campos (BR); Jose Augusto Reis Andrade, Sao Jose dos Campos (BR); Alexandre Monteiro, Sao Jose dos Campos (BR)

(73) Assignee: Embraer S.A., Sao Jose Dos Campos-SP (BR)

( * ) Notice: Subject to any disclaimer, the term of this patent is extended or adjusted under 35 U.S.C. 154(b) by 0 days.

(21) Appl. No.: 12/334,772

(22) Filed: Dec. 15, 2008

(65) Prior Publication Data

US 2010/0150151 A1    Jun. 17, 2010

(51) Int. Cl.
- *G06F 15/16* (2006.01)
- *H04L 12/26* (2006.01)
- *H04L 12/40* (2006.01)
- *H04L 12/931* (2013.01)

(52) U.S. Cl.
CPC ... *H04L 12/40169* (2013.01); *H04L 2012/4028* (2013.01); *H04L 49/351* (2013.01); *H04L 43/0811* (2013.01)
USPC ........................................... 370/352; 370/351

(58) Field of Classification Search
USPC ................................................. 370/351, 352
See application file for complete search history.

(56) References Cited

U.S. PATENT DOCUMENTS

| | | |
|---|---|---|
| 4,837,856 A | 6/1989 | Glista, Jr. |
| 4,856,728 A * | 8/1989 | Schmidt et al. ............. 242/384.1 |
| 4,970,648 A | 11/1990 | Capots |
| 5,223,844 A | 6/1993 | Mansell et al. |
| 5,442,553 A | 8/1995 | Parrillo |
| 5,467,274 A | 11/1995 | Vax |
| 5,473,772 A | 12/1995 | Halliwell et al. |
| 5,504,497 A | 4/1996 | Li |
| 5,564,051 A | 10/1996 | Halliwell et al. |
| 5,758,294 A | 5/1998 | Ganesan et al. |
| 5,890,079 A | 3/1999 | Levine |
| 5,974,349 A | 10/1999 | Levine |
| 6,092,008 A | 7/2000 | Bateman |
| 6,104,914 A | 8/2000 | Wright et al. |
| 6,144,916 A | 11/2000 | Wood, Jr. et al. |
| 6,148,179 A | 11/2000 | Wright et al. |
| 6,154,637 A | 11/2000 | Wright et al. |

(Continued)

OTHER PUBLICATIONS

Garmin, G1000 Integrated Flight Deck, Guide for Designated Pilot Examiners and Certified Flight Instructors, 190-00368-02 Rev. B (Oct. 2007).

(Continued)

*Primary Examiner* — Jay P Patel
(74) *Attorney, Agent, or Firm* — Nixon & Vanderhye P.C.

(57) ABSTRACT

Switches for Ethernet-based aircraft data buses in avionics systems provide manual means (through human interaction) to route the information transmitted on avionics system high speed data buses. For instance, the information path can be selected according to crew or maintenance people intentions. Considering a point-to-point databus connection between two pieces of equipment, adding an appropriate switch in the connection between those two pieces of equipment can allow one or more pieces of equipment to be connected to the other terminals of the switch. Therefore, depending on switch position, it is possible to establish a connection between those two or more selected pieces of equipment, where other equipment connected to open terminals may remain without access to the data bus.

21 Claims, 5 Drawing Sheets

Example of application of the switch

(56) References Cited

U.S. PATENT DOCUMENTS

| | | | |
|---|---|---|---|
| 6,160,998 | A | 12/2000 | Wright et al. |
| 6,163,681 | A | 12/2000 | Wright et al. |
| 6,167,238 | A | 12/2000 | Wright |
| 6,167,239 | A | 12/2000 | Wright et al. |
| 6,173,159 | B1 | 1/2001 | Wright et al. |
| 6,181,990 | B1 | 1/2001 | Grabowsky et al. |
| 6,205,138 | B1 | 3/2001 | Nihal et al. |
| 6,255,942 | B1 | 7/2001 | Knudsen |
| 6,278,913 | B1 | 8/2001 | Jiang |
| 6,281,810 | B1 * | 8/2001 | Factor ............... 340/971 |
| 6,308,045 | B1 | 10/2001 | Wright et al. |
| 6,353,734 | B1 | 3/2002 | Wright et al. |
| 6,496,777 | B2 | 12/2002 | Tennison et al. |
| 6,507,789 | B1 | 1/2003 | Reddy et al. |
| 6,522,867 | B1 | 2/2003 | Wright et al. |
| 6,628,648 | B1 * | 9/2003 | Francis et al. ............... 370/360 |
| 6,628,995 | B1 | 9/2003 | Korson et al. |
| 6,678,268 | B1 * | 1/2004 | Francis et al. ............... 370/380 |
| 6,735,505 | B2 | 5/2004 | Levine |
| 6,745,010 | B2 | 6/2004 | Wright et al. |
| 6,765,499 | B2 | 7/2004 | Flick |
| 6,816,728 | B2 | 11/2004 | Igloi et al. |
| 6,898,492 | B2 | 5/2005 | De Leon et al. |
| 6,957,133 | B1 | 10/2005 | Hunt et al. |
| 6,990,319 | B2 | 1/2006 | Wright et al. |
| 7,006,438 | B2 * | 2/2006 | West et al. ............... 370/231 |
| 7,035,204 | B1 * | 4/2006 | Bortolotto et al. ............ 370/218 |
| 7,123,164 | B2 | 10/2006 | Zoladek et al. |
| 7,149,508 | B2 | 12/2006 | Herle |
| 7,149,612 | B2 | 12/2006 | Stefani et al. |
| 7,203,630 | B2 | 4/2007 | Kolb et al. |
| RE39,618 | E | 5/2007 | Levine |
| 7,406,050 | B2 * | 7/2008 | Calluaud et al. ............... 370/250 |
| 7,406,518 | B2 * | 7/2008 | Lasserre ............... 709/225 |
| 7,477,614 | B2 * | 1/2009 | Hansen ............... 370/264 |
| 7,547,987 | B2 * | 6/2009 | Torigoe et al. ............... 307/10.1 |
| 7,620,157 | B2 * | 11/2009 | Holmes et al. ............... 379/39 |
| 7,684,386 | B2 * | 3/2010 | Harnois et al. ............... 370/352 |
| 2001/0002195 | A1 * | 5/2001 | Fellman et al. ............... 370/420 |
| 2002/0174251 | A1 * | 11/2002 | Lasserre ............... 709/249 |
| 2003/0167335 | A1 * | 9/2003 | Alexander ............... 709/228 |
| 2004/0111739 | A1 * | 6/2004 | Winegard ............... 725/31 |
| 2005/0220029 | A1 | 10/2005 | Calluaud et al. |
| 2005/0243808 | A1 * | 11/2005 | Cook ............... 370/352 |
| 2006/0159064 | A1 * | 7/2006 | Harnois et al. ............... 370/352 |
| 2006/0268684 | A1 | 11/2006 | Cohn |
| 2007/0190840 | A1 * | 8/2007 | Hanada et al. ............... 439/215 |
| 2007/0288103 | A1 | 12/2007 | Choudhury et al. |
| 2008/0175159 | A1 * | 7/2008 | Caveney et al. ............... 370/248 |
| 2010/0124421 | A1 * | 5/2010 | Chand et al. ............... 398/140 |
| 2012/0214550 | A1 * | 8/2012 | Galaro et al. ............... 455/561 |

OTHER PUBLICATIONS

Garmin, GDL 69/69A Satellite Data Link Receiver (2004).

Garmin, GDL 90 Data Interface Specification 560-1058-00 Rev A (Jun. 5, 2007).

Levine, Sy, "The Remote Aircraft Flight Recorder and Advisory Telemetry System—RAFT (Patent Pending)," Digital Avionics Systems Conference, 1998, Proceedings, 17th DASC. The AIAAA/IEEE/SAE, pp. J14/1-J1410 vol. 2 (Oct. 31-Nov. 7, 1998).

Ruel, Michel, "Stiction: The Hidden Menace," Control Magazine (Nov. 2000).

Kourti, Theodora, et al., "Process analysis, monitoring and diagnosis, using multivariate projection methods," Chemometrics and Intelligent Laboratory Systems 28, 3-21 (1995).

Sharif, Mohamed A., et al., "Fault Diagnosis in Industrial Control Valves and Actuators," IEEE Instrumentation and Measurement Technology Conference, St. Paul, Minnesota, USA (May 18-21, 1998).

Black Box Network Services, 10-MPBS ABC Manual Switch (SWL065A), Black Box Corporation, XP-002589385 (Apr. 22, 1998).

European Search Report, European Patent Application No. 09179354.7, Publication No. EP 2 222 032 A1 (Aug. 25, 2010).

* cited by examiner

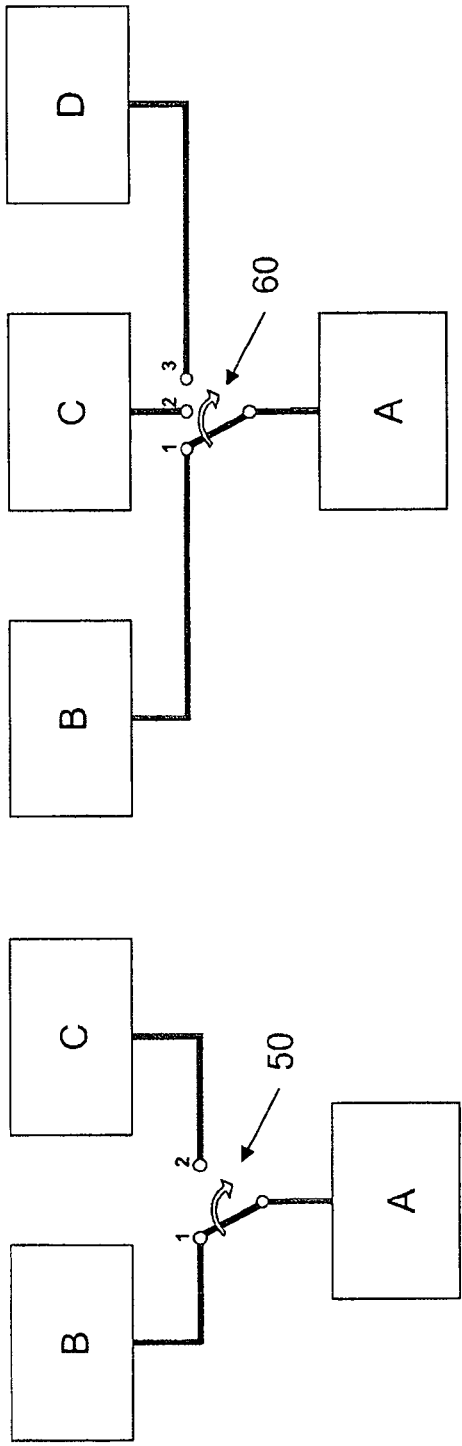
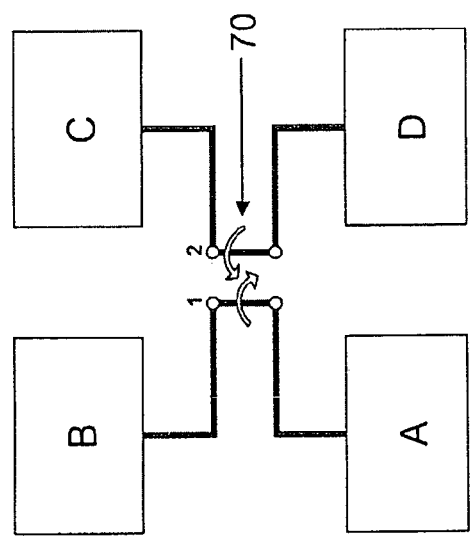
FIG. 1B
FIG. 1A
FIG. 1C

Example of application of the switch

Example of application of the switch

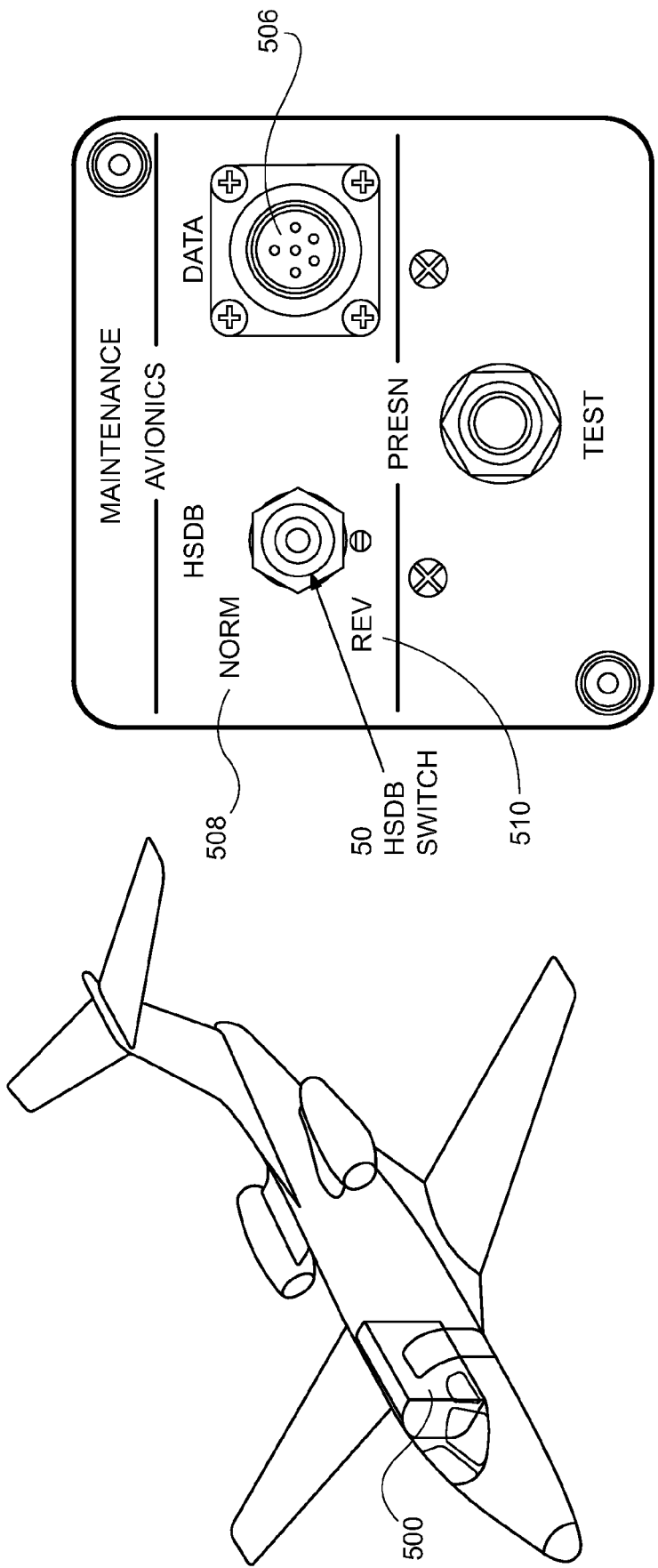

SWITCH USAGE FOR ROUTING ETHERNET-BASED AIRCRAFT DATA BUSES IN AVIONICS SYSTEMS

CROSS-REFERENCES TO RELATED APPLICATIONS

N/A

STATEMENT REGARDING FEDERALLY SPONSORED RESEARCH OR DEVELOPMENT

N/A

FIELD

The technology herein relates to avionic. More particularly, the technology herein relates to the use of mechanical, electromechanical or other switches for Ethernet-based aircraft data buses in avionics systems of the type comprising for example communications, navigation and management of multiple systems. An exemplary illustrative non-limiting solution provides manual means (through human interaction) to route information transmitted on one or more avionics system high speed data buses. In one exemplary illustrative non-limiting implementation, the information path can be selected according to intentions of crew or maintenance people.

BACKGROUND AND SUMMARY

A typical architecture for avionic system includes several different equipment performing different functions. For example, an avionics system may:

Display flight, systems and other useful information to the crew

Record flight and system information

Include sensors that sense of the state of the aircraft (e.g.: pitch, roll, heading, altitude, airspeed, vertical speed, etc.)

Communicate with the air traffic control, other aircraft, etc.

Provide navigation functions to inform the pilot of the position of the aircraft Other functions.

Mechanisms for routing information along different paths between avionics equipment bring benefits such as redundancy and increase in the availability of certain functions. As an example, if there are plural redundant paths, in case of failure of one path the routing system can be configured to allow the remaining path(s) to transmit information. Such configuration or reconfiguration can be either automatic (no human interaction required) or manual (e.g., using or requiring human interaction).

Ethernet-based high speed data buses have been used in avionics system. One such application is to provide data to multiple display units. In one exemplary such system for example, the Ethernet interface is cut off when one of the display units fails. In response to detection of such failure, the system may revert to using backup data communications paths. The change to backup paths may be completely automated so that no pilot action is required.

Thus, due to data bus high speed issues, data routing is commonly performed by electronic switchers or hubs. Such switchers or hubs are additional, complex electronic circuits that perform the tasks automatically. For example, ethernet switchers are very complex equipment comprising complex electronics to compute logic for routing.

It is also known to use so-called "point to point" communications between equipment. For example, it is known to use a radio port in a wireless personal communications system wherein the communication between first and second units is achieved by a digital switching device, the latter preferably a time slot interchange unit. For "point to point" connections, normal electromechanical switches can be preferred given their low cost, simplicity and high reliability. However due to switch physical characteristics, such applications in electronics equipment may be limited.

Several state-of-the-art technologies are found in the largest aircraft. However, as equipment increases in complexity, it can also have increased volume and weight. Mainly in smaller aircraft, due to weight and volume constraints, simpler solutions are generally preferred.

On the other hand, avionics high speed data buses shall comply with susceptibility to electromagnetic interference requirements. In order to reduce or isolate interference to data buses, cables with shielding and twisted wires are typically used. If a switch is installed, it can increase susceptibility to electromagnetic interference, mainly due to reduced electromagnetic shielding.

Due to potential susceptibility to electromagnetic interference of electromechanical switches and what can sometimes be rigid or at least desirable requirements for high speed data buses not to have their performance affected due to interference, the use of electromechanical switches for switching high speed avionics data buses has been avoided at least sometimes in the past.

An exemplary illustrative non-limiting implementation provides avionic systems with increased dispatch reliability wherein equipment that is part of the avionics system can be dispatched or reconfigured to be inoperative (if not required), and the information that would otherwise flow through failed or otherwise inoperative equipment can be routed to another path using at least one mechanical or electromechanical switch.

Safety can be increased since if one path (or equipment) fails or is otherwise inoperative, the switch can be changed or reconfigured (i.e., manually "switched") in order to route information through another path(s) (e.g., to other equipment).

The exemplary illustrative non-limiting implementation relates to the use of switches for Ethernet-based aircraft data buses in avionics systems. An exemplary illustrative non-limiting solution provides manual means (through human interaction) to route the information transmitted on avionics system high speed data buses. For instance, the information path can be selected according to intentions of human beings including for example crew or maintenance people.

Considering a point-to-point data bus connection between two pieces of equipment, an exemplary illustrative non-limiting solution consists of adding an appropriate switch in the connection between those pieces of equipment. This feature can allow one or more pieces of equipment to be connected to the other terminals of the switch. Therefore, for example, depending on the switch position, it is possible to establish a connection between those two pieces of equipment, where the other pieces of equipment that are connected to open terminals of the switch remain without access to the data bus.

The use of switches for selection of avionics data bus paths provides manual selection (human interaction) of the path the information shall flow. This selection can be performed, for example, by the crew any time and/or by maintenance people on ground.

The definition of and type of switch used may depend on a selection of the most adequate or at least satisfactory switch available that can be used as part of the data bus. It is desirable to perform tests to verify the behavior of the switch and associated hardware assemblies to ensure that no interference or other problems are experienced due to use or insertion of the switch.

The number of poles of the switch may depend on the number of wires of the data bus cable. The switch can for example establish communication between equipment or access ports (for example, a panel that contains a connector for notebooks). The switch can be actuated by operation of a lever, rotary knob, push button, etc.

An exemplary illustrative non-limiting data bus may find advantageous use in aircraft wherein data buses transmit avionics information such as airspeed, altitude, position and other navigational information or another reading for maintenance or other purpose.

Example non-limiting advantages provided by use of an electromechanical switch include:

Dispatch reliability: equipment that is part of the bus can be dispatched inoperative (if not required), and the information that would flow through this failed equipment can be routed to another path using the switch.

Additional safety increase: if one path fails, the switch can be changed to route through another path(s).

Taking the example 1 of FIG. 1 (see below), in case of failure of equipment "B" but when equipment "A" continues to be healthy, "A" can continue to communicate with equipment "C".

Increase in the availability of some functions: functions that would be lost due to a broken link can become available using another path if a switch is installed.

No additional electronic equipment and circuits are required (compare for example "hub" and "electronic switchers" of other applications).

No additional power consumption, or minimum power consumption in case of relays.

Switches have high reliability and low cost.

BRIEF DESCRIPTION OF THE DRAWINGS

These and other features and advantages will be better and more completely understood by referring to the following detailed description of exemplary non-limiting illustrative embodiments in conjunction with the drawings of which:

FIGS. 1A, 1B and 1C show exemplary illustrative non-limiting ethernet switching connection examples;

FIGS. 3A, 3B show example switch installations on board an aircraft.

DETAILED DESCRIPTION

FIGS. 1A, 1B and 1C show three general examples of connections that can be manually switched. The boxes (labeled A, B, C and D) in these figures can be equipment or access ports (for example, a connector to provide access to a notebook computer or other equipment).

The FIG. 1A example comprises three pieces of equipment (A, B, C) and a switch 50 with two positions. The switch 50, if placed in position number "1", connects equipment "A" to equipment "B". If the lever of the switch 50 is changed to position number "2", equipment "A" becomes connected to equipment "C" instead of equipment "B". The switch 50 may have as many poles as is necessary to switch all conductors connecting equipment A with equipment B and/or equipment C. As mentioned above, the data paths that switch 50 switches may be high speed data paths such as Ethernet or other high speed paths carrying data signals at rates of 1 mbits/second to 10 mbits/second or more.

The FIG. 1B example allows equipment "A" to be connected to equipment "B" or "C" or "D" through a switch 60 with three positions.

The FIG. 1C example shows a switch 70 with two positions. Switch 70 allows cross communication. In this case, when equipment "A" is connected to equipment "B", simultaneously equipment "D" is connected to equipment "C". In case the switch 70 position is changed, equipment "A" becomes connected to equipment "C" and equipment "D" to equipment "B".

Taking the example of FIG. 1C and considering that "A" in one exemplary illustrative non-limiting implementation may be an access port, the switch 70 allows selection of data from equipment "B", "C" or "D" to be routed to the access port A.

FIGS. 2a and 2b-1 and 2b-2 show possible exemplary illustrative non-limiting applications of an electromechanical switch in avionic systems.

Figure 2A:
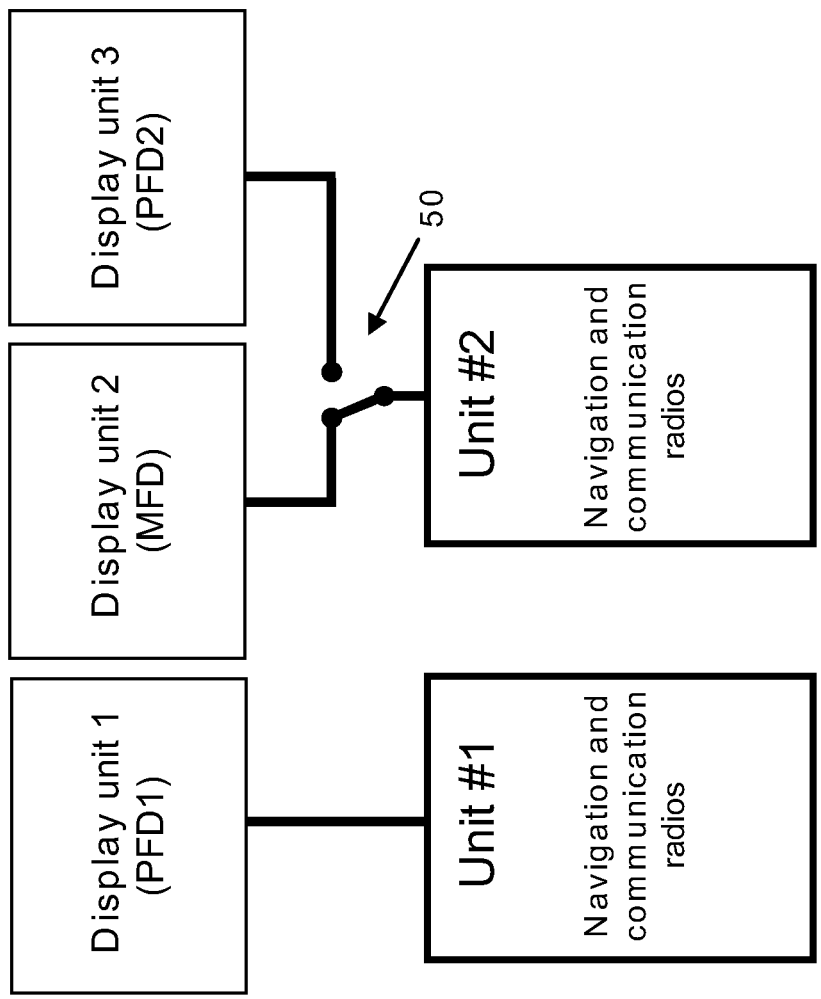
FIGS. 2A, 2B-1 and 2B-2 show example applications of an exemplary illustrative non-limiting switch.
Figures 1, 2B:
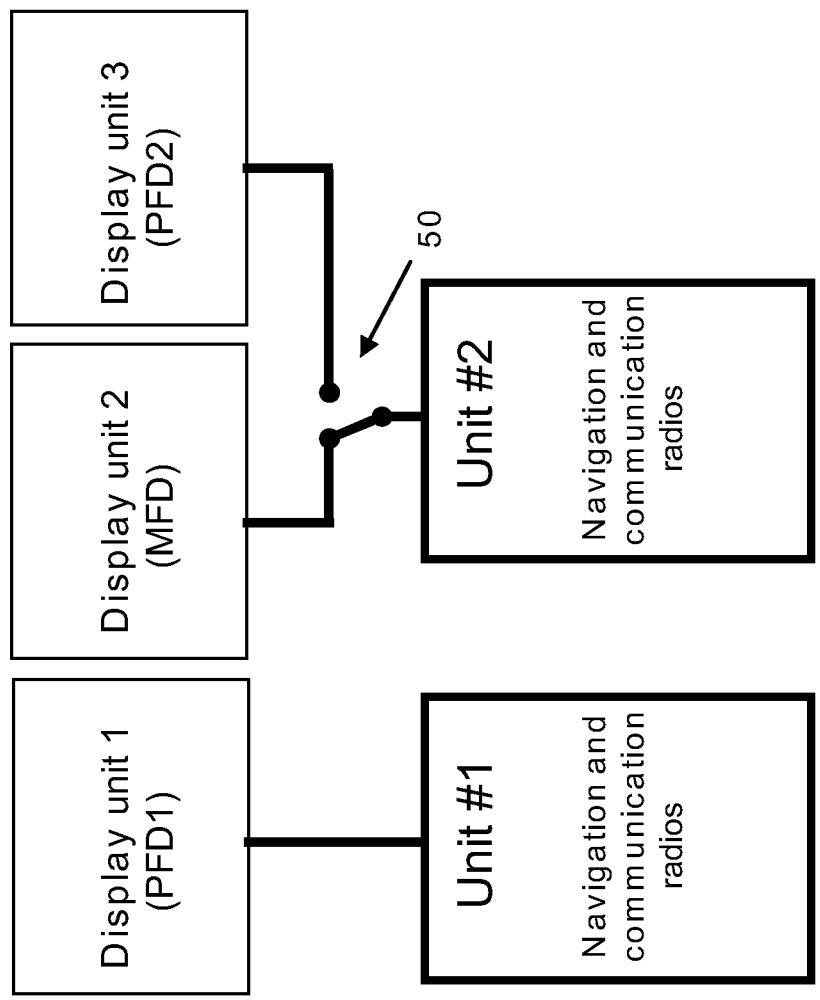
Figures 2, 2B:
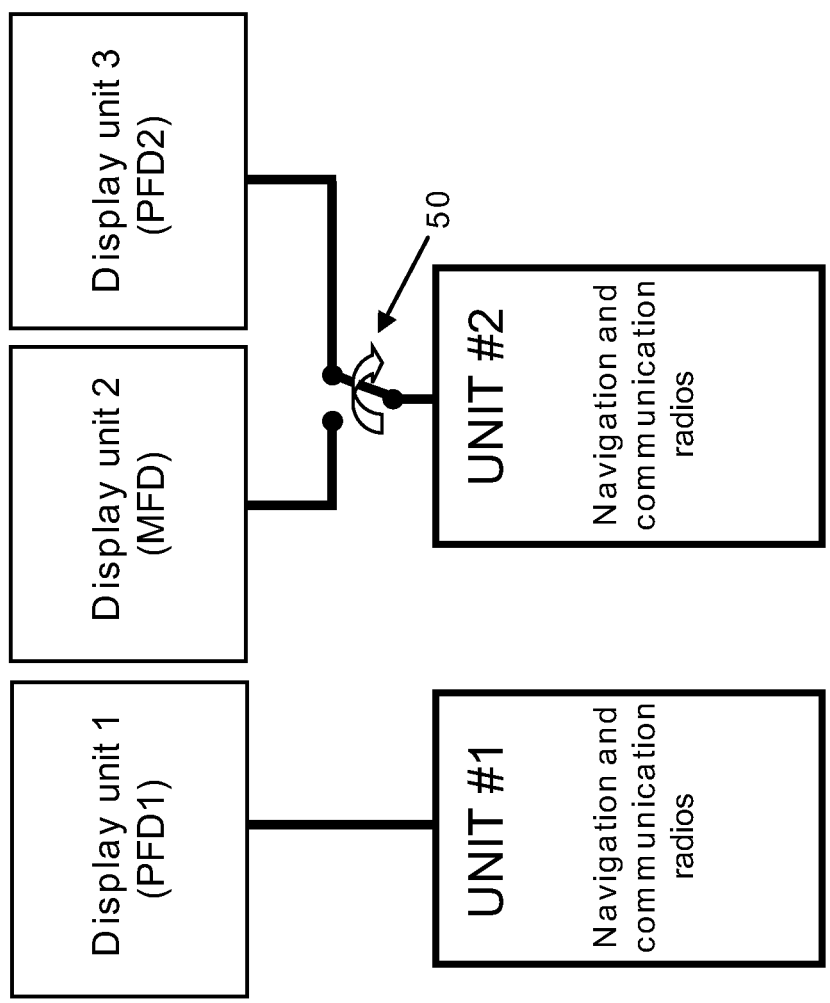

As can be seen in FIG. 2A, UNIT#1 may be directly connected to one display unit PFD1 while the UNIT#2 can be connected alternatively to either to display unit MFD or display unit PFD2, depending on the position of switch 50. For example, if display unit MFD fails (see FIG. 2B-2), the interaction from UNIT #2 is lost to the rest of the system, but a pilot (or maintenance people) can make UNIT #2 information available again by operating the switch 50 to connect it to display unit PFD2. This results in better availability of UNIT #2 information, resulting also in a higher level of safety. Note that the same is not applicable for UNIT #1. On the other hand, because UNIT #1 is directly connected to display unit PFD1 (not through any electromechanical switch) in the implementation shown, the information from UNIT #1 will be lost in case of display unit PFD1 failure. This is because there is no switch to connect UNIT #1 to another display unit.

Detailed Example Switch Installation

FIGS. 3A, 3B shows an example installation on board an aircraft. FIG. 3A shows an example portion of an aircraft maintenance panel 504 is installed. For example, maintenance panel 504 may be found as part of a forward cabinet on board a small business or executive jet (portion designated 500) such as for example the Embraer Phenom. While the switch is shown being installed as part of the maintenance panel 504, it could also be installed as part of the main cockpit control panel or other control panel. As shown in FIG. 3B, the switch 50 can have two positions: "normal" and "reversionary". In the "normal" position, the switch 50 couples the data line of two pieces of equipment that should be connected together (e.g., a sensor feed to a display unit). In the "rev" position, the switch 50 decouples those two pieces of equipment and instead connects one of the two pieces of equipment to a different piece of equipment (e.g., the sensor feed to a different display unit).

The example switch 50 shown has the following exemplary illustrative non-limiting characteristics:

Made to MIL-DTL-8834 requirements

Sealed bushing 4 pole circuitry to accommodate all four conductors of an Ethernet high speed data connection (a differential pair for transmit, and a second differential pair for receive)

Wiping action contacts

Lever lock actuator

Data flows through the switch at 10 Mbps or more. It was preferred to use a switch adequate to be used on 30 mA current level. Small switches are preferred to reduce interference. Exemplary switch 50 has a lever lock in order to avoid inadvertent change in the switch position. There are desired characteristics regarding the maximum size of the pig tails, in such manner to minimize the area without shielding. In an exemplary illustrative non-limiting implementation, the switch may be installed in the maintenance panel, which one is not enclosured but the panel surface is grounded. The cabling between the switch and the panel connector are also shielded, but there are regions with pigtails. Again, this unshielded region inside the panel is also minimized.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. System for point-to-point manual routing of data between avionics equipment comprising:
   first structure for point-to-point routing high speed data from first avionics equipment on board an aircraft to second avionics equipment on board said aircraft through a manually-operable electromechanical switch having at least first and second manually-settable positions and associated electrical contacts; and
   second structure coupled to the first structure for manually changing position of the electromechanical switch to instead point-to-point route said high speed data from the first avionics equipment to third avionics equipment on board said aircraft and different from said second avionics equipment,
   wherein the electromechanical switch connects said high speed data point-to-point from said first equipment to said second or third equipment through said manually-settable electromechanical switch electrical contacts at a flow rate in excess of 1 mbits/second.

2. The system of claim 1 wherein said switch electrical contacts comprise wiper contacts.

3. The system of claim 1 wherein said switch has first, second and third multipole manually settable positions.

4. The system of claim 1 wherein said switch in a first position point-to-point cross-connects said first and second equipment and also point-to-point cross-connects said third equipment with fourth avionics equipment, and in a second position different from said first position point-to-point cross-connects said first and third equipment and point-to-point cross-connects said second and fourth equipment.

5. The system of claim 1 wherein said avionics equipment includes at least one high speed data port in communication with said switch via Ethernet connections.

6. The system of claim 1 wherein the routing avoids routing data through any hub.

7. The system of claim 1 wherein the manually-operable electromechanical switch is unpowered and configured so that manually-applied force moves the electrical contacts to cause the electrical contacts to switch.

8. The system of claim 1 wherein the manually-operable electromechanical switch is passive.

9. A system for point-to-point routing data between avionics equipment comprising:
   at least one manually-operable electromechanical switch having at least first and second positions, said switch point-to-point routing high speed data from first avionics equipment on board an aircraft to second avionics equipment on board said aircraft, said switch having an actuator that manually changes the position of the electromechanical switch to change the point-to-point routing of said high speed data from the first avionics equipment to third avionics equipment on board said aircraft and different from said second avionics equipment, and
   high speed data lines coupled to said switch, said high speed data lines supporting point-to-point flow of high speed digital data through said switch from the first equipment to the second or third equipment at a rate in excess of 1 mbit/second.

10. The system of claim 9 wherein said switch comprises multiple poles.

11. The system of claim 9 wherein said switch includes a lever lock.

12. The system of claim 9 wherein said switch comprises at least one electrically-actuated device.

13. The system of claim 9 further including a switch actuator installed in a panel on board an aircraft.

14. The system of claim 9 wherein said switch couples first and second avionics equipment via said high speed data.

15. The system of claim 9 wherein said switch includes electrical contacts movable by manually-applied force to switch at least two poles of a high speed data bus.

16. The system of claim 15 wherein said high speed data bus comprises an Ethernet based data bus.

17. The system of claim 9 wherein said switch is selected to reduce susceptibility of electromagnetic interference.

18. The system of claim 9 wherein said switch comprises wiper action contacts.

19. The system of claim 9 wherein said switch comprises at least first and second positions.

20. The system of claim 9 wherein the system does not include any hub for routing the high speed data from the first equipment.

21. The system of claim 9 wherein the manually-operable electromechanical switch is passive.

* * * * *